(12) United States Patent
Saitoh et al.

(10) Patent No.: US 10,791,811 B2
(45) Date of Patent: Oct. 6, 2020

(54) STRAP

(71) Applicant: PANASONIC INTELLECTUAL PROPERTY MANAGEMENT CO., LTD., Osaka (JP)

(72) Inventors: Eiji Saitoh, Kanagawa (JP); Shinji Tomobe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/658,376

(22) Filed: Oct. 21, 2019

(65) Prior Publication Data
US 2020/0196726 A1 Jun. 25, 2020

(30) Foreign Application Priority Data
Dec. 25, 2018 (JP) ................. 2018-240945

(51) Int. Cl.
*A45C 13/00* (2006.01)
*A45C 13/30* (2006.01)
*A45F 5/10* (2006.01)
*F16M 13/02* (2006.01)
*F16M 13/04* (2006.01)
*A45C 11/00* (2006.01)

(52) U.S. Cl.
CPC ............. *A45C 13/30* (2013.01); *A45F 5/10* (2013.01); *F16M 13/02* (2013.01); *F16M 13/04* (2013.01); *A45C 2011/002* (2013.01); *A45F 2005/1013* (2013.01); *A45F 2200/0516* (2013.01)

(58) Field of Classification Search
CPC ..... A45C 13/30; A45C 2011/002; A45F 5/10; A45F 2005/1013; A45F 2200/0516; F16M 13/02; F16M 13/04
USPC ........................................................ 224/218
See application file for complete search history.

(56) References Cited

U.S. PATENT DOCUMENTS

| | | | |
|---|---|---|---|
| 6,301,101 B1 * | 10/2001 | Anzai | G06F 1/1626 361/679.3 |
| 7,359,184 B2 * | 4/2008 | Lord | G06F 1/1616 206/320 |
| 9,362,968 B1 * | 6/2016 | Haymond | H04B 1/385 |

(Continued)

FOREIGN PATENT DOCUMENTS

| | | |
|---|---|---|
| JP | 10-163640 A | 6/1998 |
| JP | 2009-205531 A | 9/2009 |

(Continued)

*Primary Examiner* — Peter N Helvey
(74) *Attorney, Agent, or Firm* — Greenblum & Bernstein, P.L.C.

(57) ABSTRACT

A strap used in a portable terminal includes a plate portion configured to be mounted on a surface of a main body of the portable terminal by attaching to a strap fixing portion of the main body, a rotation mechanism portion located at a substantially central portion of the plate portion and having a rotation axis located in a fourth area of the main body when the strap is mounted to the main body, a grip portion provided on the rotation mechanism portion, and a folded portion provided on the plate portion, and located at a position of a third area of the main body so as to be substantially orthogonal to a longitudinal direction, and to be bent in a direction toward the surface of the portable terminal when the strap is mounted to the main body.

3 Claims, 8 Drawing Sheets

(56) References Cited

U.S. PATENT DOCUMENTS

| | | | |
|---|---|---|---|
| 9,407,743 B1* | 8/2016 | Hirshberg | F16M 13/022 |
| 10,043,045 B1 | 8/2018 | Aoyama et al. | |
| 10,482,297 B2 | 11/2019 | Aoyama et al. | |
| 2002/0197073 A1* | 12/2002 | Shibayama | H04N 5/2251 |
| | | | 396/419 |
| 2006/0204241 A1* | 9/2006 | Koide | H04N 5/2251 |
| | | | 396/423 |
| 2006/0274493 A1* | 12/2006 | Richardson | H05K 5/068 |
| | | | 361/679.4 |
| 2009/0219677 A1 | 9/2009 | Mori et al. | |
| 2010/0296235 A1* | 11/2010 | Takemasa | G06F 1/1616 |
| | | | 361/679.21 |
| 2013/0240578 A1* | 9/2013 | Yu | H04B 1/385 |
| | | | 224/197 |
| 2014/0084035 A1* | 3/2014 | Georges | A45F 5/00 |
| | | | 224/267 |
| 2015/0009610 A1* | 1/2015 | London | G06F 1/163 |
| | | | 361/679.03 |
| 2015/0201723 A1* | 7/2015 | Rayner | A45C 13/008 |
| | | | 224/191 |
| 2015/0318885 A1* | 11/2015 | Earle | H04B 1/3888 |
| | | | 455/575.6 |
| 2015/0335138 A1* | 11/2015 | Juarbe | H04M 1/04 |
| | | | 224/218 |
| 2016/0020808 A1* | 1/2016 | Lee | H04B 1/3888 |
| | | | 455/575.6 |
| 2016/0183393 A1* | 6/2016 | Groom | B62B 9/26 |
| | | | 280/33.992 |
| 2016/0233909 A1* | 8/2016 | West | H04B 1/385 |
| 2017/0000250 A1* | 1/2017 | Carnevali | A45F 5/10 |
| 2017/0244438 A1 | 8/2017 | Tomobe et al. | |
| 2018/0241428 A1 | 8/2018 | Tomobe et al. | |

FOREIGN PATENT DOCUMENTS

| | | |
|---|---|---|
| JP | 2017-144186 A | 8/2017 |
| JP | 6365962 B1 | 8/2018 |
| KR | 10-1547637 B1 | 8/2015 |

\* cited by examiner

STRAP

BACKGROUND OF THE INVENTION

1. Field of the Invention

The present disclosure relates to a strap.

2. Description of the Related Art

There has been known an electronic device including a bar code reader capable of coping with different directions (see JP-B-6365962).

JP-B-6365962 describes a portable terminal which can be operated either vertically or horizontally.

JP-B-6365962 describes that a strap attached to the portable terminal includes a first member and a second member arranged on an upper portion of the first member and coupled to the first member, and a space into which a finger can be inserted is provided between the first member and the second member in order to enable the strap to be griped. JP-B-6365962 describes that the second member of the strap may be rotatably attached to the first member.

However, in a case where a large capacity battery pack is mounted to the portable terminal for long-term use of the portable terminal, the battery pack protrudes in a state of being raised from a back surface of the terminal. When the strap is mounted from above, a surface of the strap on the portable terminal side is bent. The bending presses a rotation mechanism of the strap, thereby inhibiting smooth rotation of the portable terminal.

SUMMARY OF THE INVENTION

An object of the present disclosure is to provide a strap which allows a user to grip a portable terminal which can be operated in any direction without inhibiting vertical and horizontal rotation of the portable terminal, even when a large capacity battery pack protruding in a state of being raised from a back surface of the portable terminal is used.

The above-described object of the present disclosure is achieved by below-described structures.

(1) A strap used in a portable terminal, the portable terminal having a rectangular shape in a plan view and including a main body with a first surface having a display and a second surface facing the first surface, a camera capable of photographing an object in a state that the second surface facing the object, and a strap fixing portion, among four sides of the second surface of the main body, imaginary lines dividing two sides of the four sides of the second surface, which are extending in a longitudinal direction and are longer than the other two sides, into seven equal parts being virtually arranged, and the imaginary lines dividing the main body into seven areas in a plan view from the second surface, when the main body is arranged in which one of the two sides longer than the other two sides is arranged on an upper side, and the seven areas are defined as a first area to a seventh area in order from the left or from the right, a battery pack storage area of the main body storing a battery pack being provided in an area extending from the fourth area to the seventh area of the portable terminal, and the camera being provided in an area extending from the second area to the third area of the portable terminal, and the strap fixing portion being provided in at least one of the first area and the seventh area of the portable terminal, the strap including:

a plate portion configured to be mounted on the second surface of the main body by attaching to the strap fixing portion;

a rotation mechanism portion located at a substantially central portion of the plate portion and having a rotation axis located in the fourth area when the strap is mounted to the main body;

a grip portion provided on the rotation mechanism portion and configured to be gripped by a user of the portable terminal; and a folded portion provided on the plate portion, and located at a position of the third area so as to be substantially orthogonal to the longitudinal direction, and to be bent in a direction toward the second surface of the portable terminal when the strap is mounted to the main body.

(2) In the strap according to the above-described (1), the strap fixing portion is a strap hole, a string-like support portion is provided on the plate portion, and the string-like support portion is bound to the strap hole.

(3) In the strap according to the above-described (2), the plate portion is made of leather.

BRIEF DESCRIPTION OF DRAWINGS

FIGS. 1A and 1B are views showing an example of a portable terminal according to the present disclosure, in which FIG. 1A is a front view, and FIG. 1B is a back view.

FIGS. 3A and 3B are views showing a strap attached to the portable terminal according to an embodiment, in which FIG. 3A is a front view, and FIG. 3B is a back view.

FIGS. 4A and 4B are conceptual diagrams showing a state in which the strap is mounted to the portable terminal, in which FIG. 4A is a diagram when using a normal battery pack, and FIG. 4B is a diagram when using a large capacity battery pack.

FIGS. 5A and 5B are views as viewed from below the portable terminal of FIGS. 4A and 4B, in which FIG. 5A is a view when using the normal battery pack, and FIG. 5B is a view when using the large capacity battery pack.

FIGS. 8A and 8B are views showing an area division in a short side direction of the portable terminal, in which FIG. 8A is a view showing a state in which the strap is not mounted, and FIG. 8B is a view showing a state in which the strap is mounted.

DETAILED DESCRIPTION OF THE EXEMPLARY EMBODIMENTS

Hereinafter, an embodiment (hereinafter, referred to as "the present embodiment") which specifically discloses a portable terminal and a strap according to the present disclosure will be described in detail with reference to the drawings as appropriate. However, unnecessarily detailed description may be omitted. For example, a detailed description of already well-known matter or a repeated description of substantially the same configuration may be omitted. This is to avoid unnecessary redundancy in the following description and to facilitate understanding of those skilled in the art. It should be noted that the accompanying drawings and the following description are provided to provide enable those skilled in the art to fully understand the present disclosure, and are not intended to limit the claimed subject matter.

Hereinafter, an exemplary embodiment for carrying out the present disclosure will be described in detail with reference to the drawings.

Figure 1A:
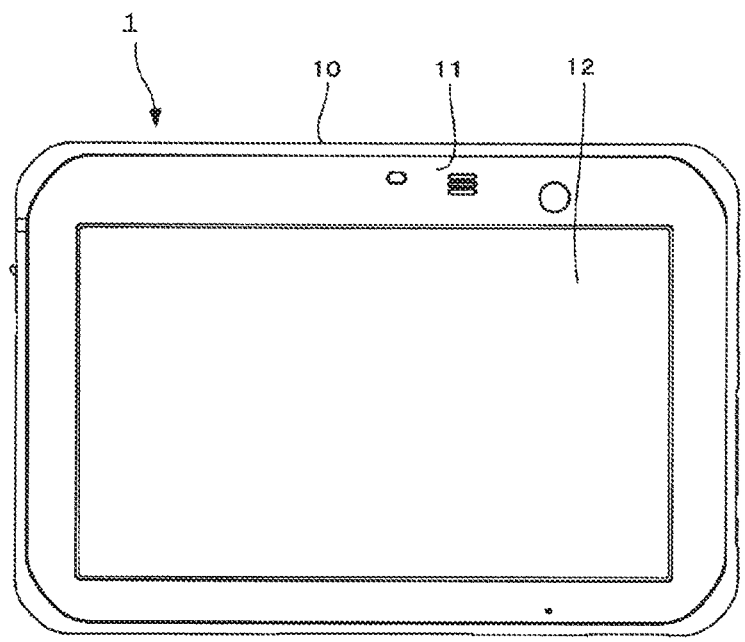
Figure 1B:
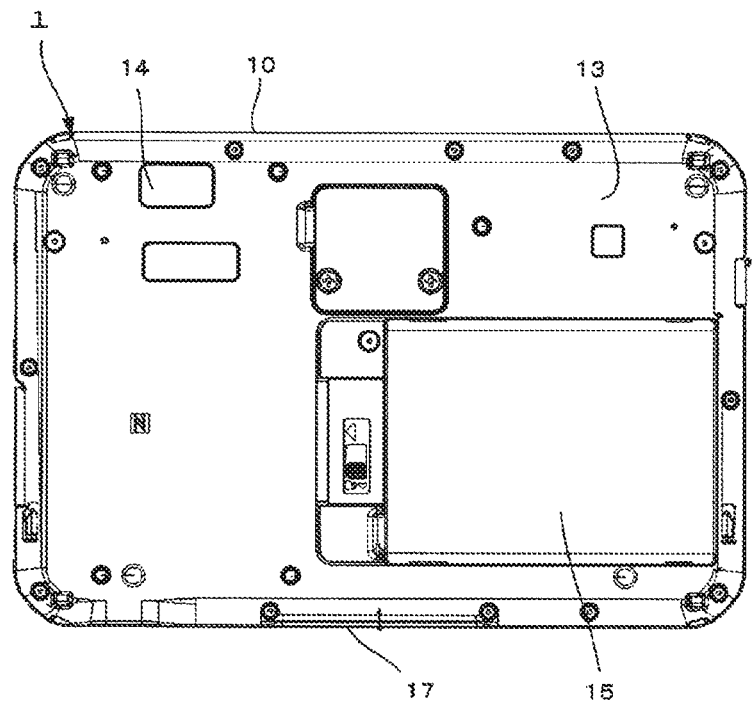

FIGS. 1A and 1B are views showing an example of a portable terminal according to the present disclosure, in which FIG. 1A is a front view, and FIG. 1B is a back view. The portable terminal of the present disclosure will be described in detail based on FIGS. 1A and 1B.

A portable terminal 1 is an electronic device including personal use and business use, for example a mobile phone such as a smartphone, a tablet, a digital camera, a portable personal computer, a wireless device, or the like. The portable terminal 1 of the present embodiment has impact resistance, vibration resistance, drip-proof, dust-proof, or the like, is used in a commercial site such as a factory, construction, public safety, and transport company, and is an example of a tablet type portable terminal which is heavier than a general portable terminal.

The portable terminal 1 is mainly made of a resin, and includes a main body 10 having a rectangular shape in a plan view, a display 12 including a display such as a liquid crystal panel or an organic EL panel arranged on a front surface 11 of the main body 10, and a back surface 13 opposite to the front surface 11 of the main body 10. The back surface 13 is provided with a camera 14 and a battery pack storage area 15. A connector 17 is provided at a lower portion of the portable terminal 1, and can be connected to a cradle (not shown) for the portable terminal 1 to perform charging and data transfer.

The display 12 includes a touch panel having a substantially rectangular shape in a plan view, displays an icon, an image, information data, or the like, and has a user interface (UI) type display function which can be operated. The camera 14 is capable of photographing in a state of facing an object, and the battery pack storage area 15 is an area storing a battery pack.

An area of the main body 10 of the portable terminal 1 will be described with reference to FIGS. 2A and 2B.

An imaginary line L (see a broken line in FIGS. 2A and 2B) which divides each of two sides 10a, 10b in a longitudinal direction of the main body 10 into seven equal parts is virtually arranged, the imaginary line L divides the main body 10 into seven areas in a plan view from the back surface 13, and defines one of the two sides 10a, 10b in the longitudinal direction arranged on an upper side as an upper side. In FIGS. 2A and 2B, the side 10a in the longitudinal direction on an upper side is the upper side, and the other side 10b is a lower side.

Figure 2A:
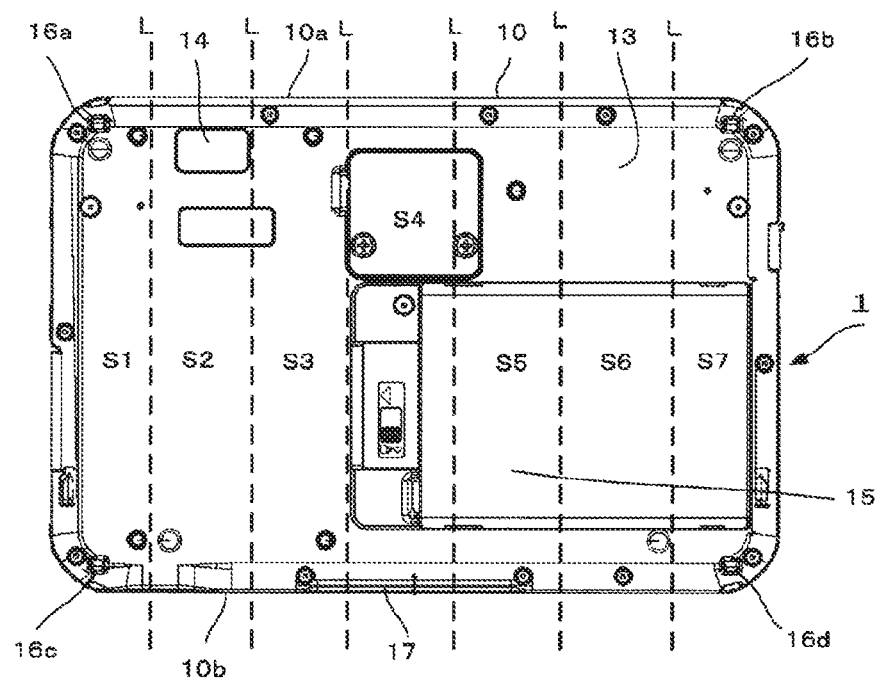
FIGS. 2A and 2B are view for explaining an area of a main body of the portable terminal according to the present disclosure.

The seven areas including the upper side 10a are defined as a first area S1, a second area S2, a third area S3, a fourth area S4, a fifth area S5, a sixth area S6, and a seventh area S7 in order from the left (see FIG. 2A). Incidentally, an arrangement in which left and right is reversed is also conceivable. In FIG. 2B, the seven areas including the upper side 10a are defined as the first area S1, the second area S2, the third area S3, the fourth area S4, the fifth area S5, the sixth area S6, and the seventh area S7 in order from the right.

Figure 2B:
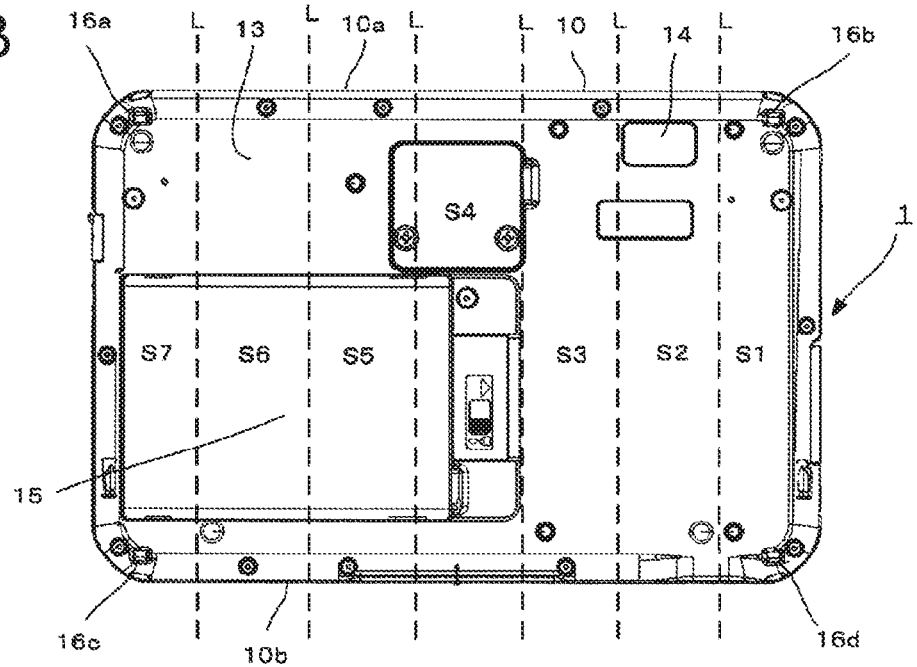

In the present embodiment, the battery pack storage area 15 storing the battery pack is provided in the seventh area S7 from the fourth area S4 including the fourth area S4, and the camera 14 is provided in the third area S3 from the second area S2 (see FIGS. 2A and 2B).

Strap fixing portions 16a to 16d are provided in the first area S1 and the seventh area S7. In FIGS. 2A and 2B, a first fixing portion 16a is provided at an upper left corner of the main body 10, a second fixing portion 16b is provided at an upper right corner of the main body 10, a third fixing portion 16c is provided in a lower left corner of the main body 10, and a fourth fixing portion 16d is provided in a lower right corner of the main body 10. In the present embodiment, the strap fixing portions 16a to 16d are strap holes, but the present invention is not limited thereto.

Figure 3A:
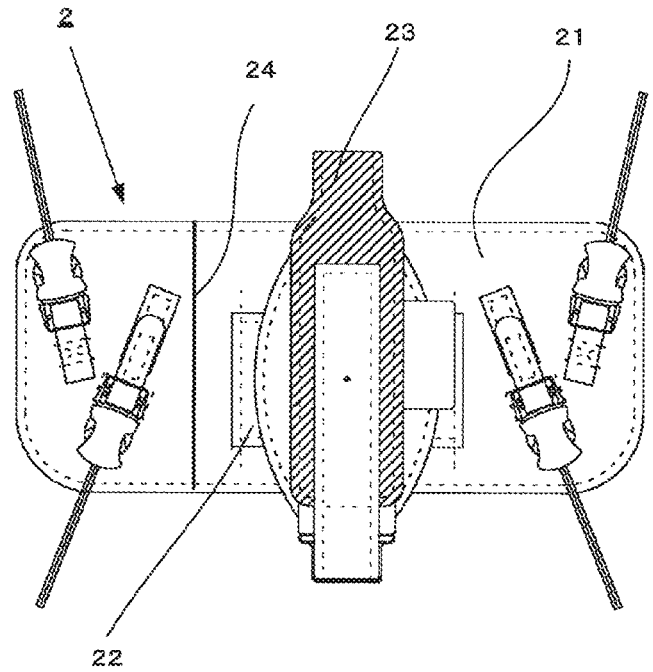
Figure 3B:
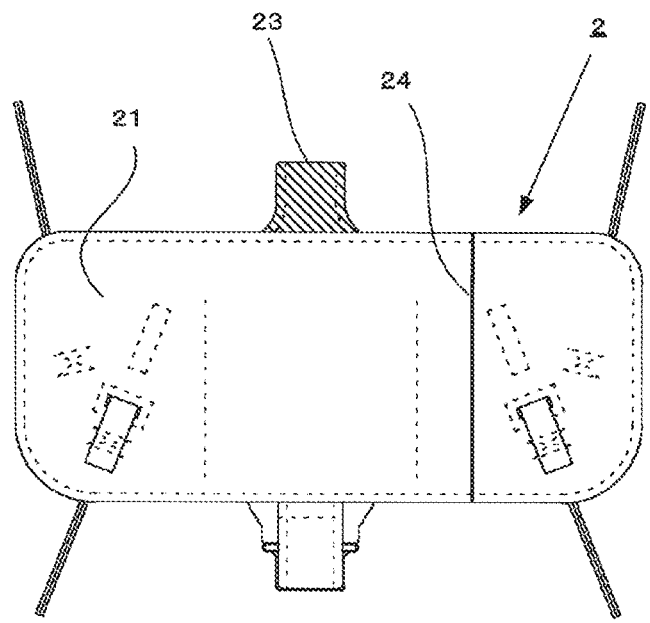
Figure 4A:
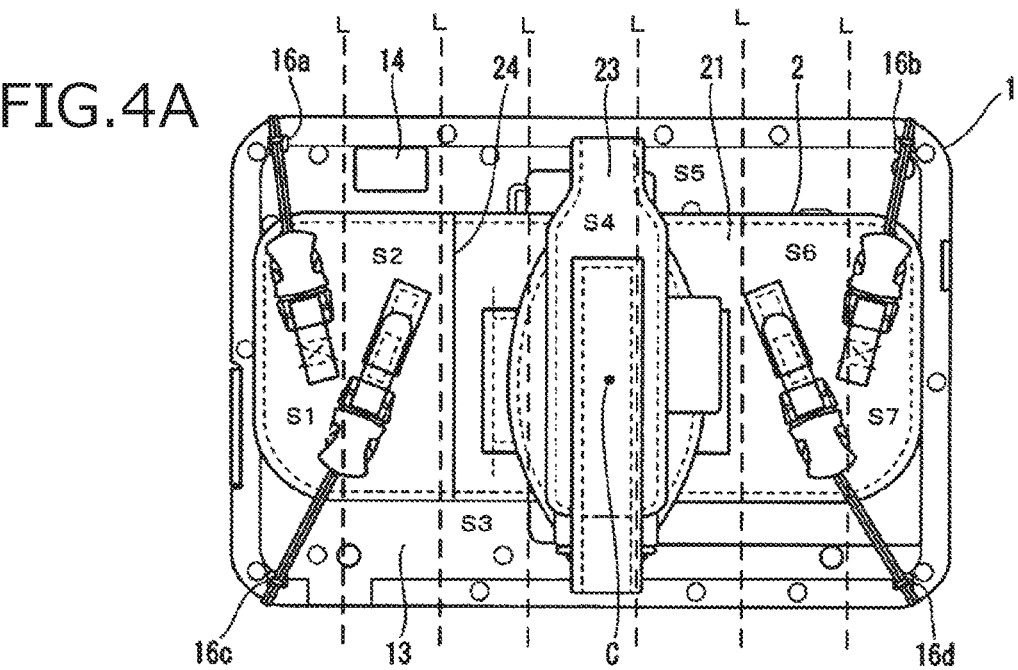
Figure 4B:
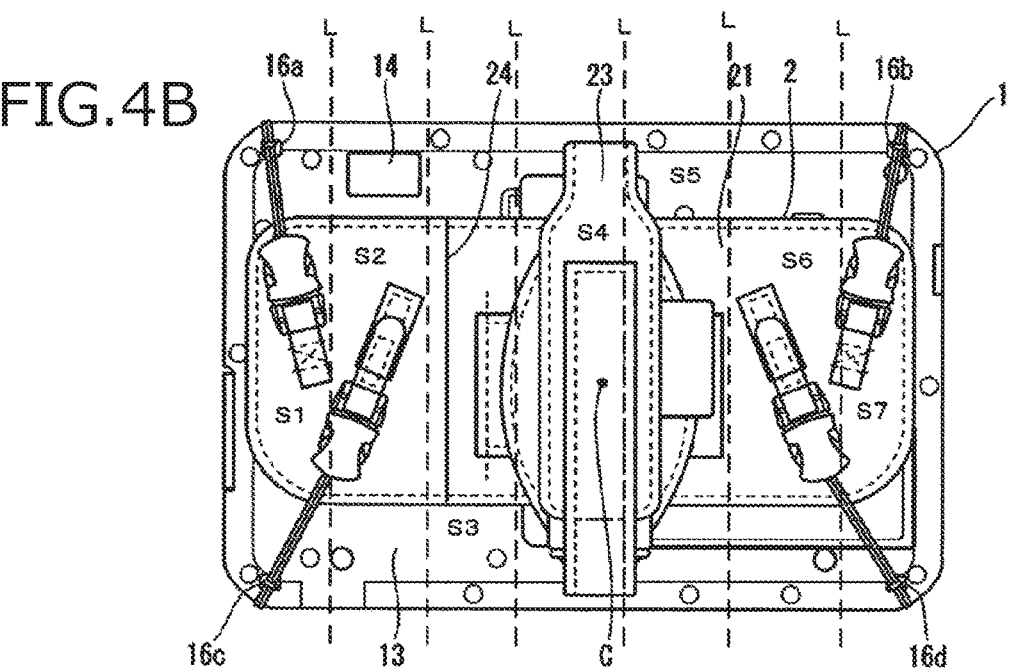
Figure 5A:
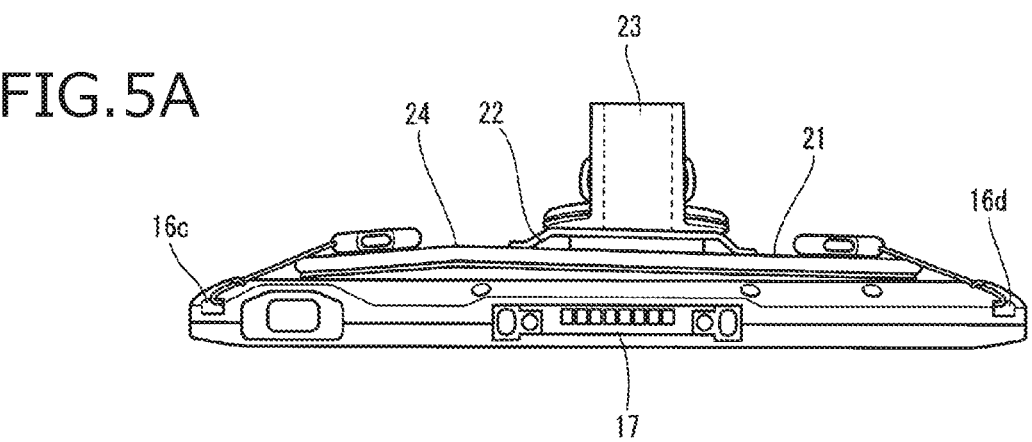
Figure 5B:
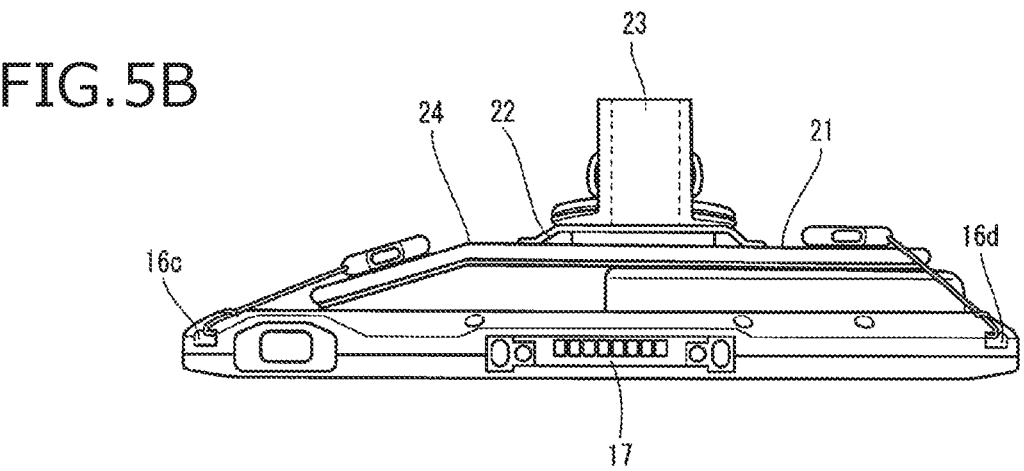

FIGS. 3A and 3B are views showing the strap attached to the portable terminal according to the embodiment, in which FIG. 3A is a front view, and FIG. 3B is a back view. FIGS. 4A and 4B are conceptual diagrams showing a state in which the strap 2 is mounted to the portable terminal 1, in which FIG. 4A is a diagram when using a normal battery pack, and FIG. 4B is a diagram when using a large capacity battery pack. In addition, FIGS. 5A and 5B are views illustrating the portable terminal 1 of FIGS. 4A and 4B as viewed from below, in which FIG. 5A is a view when using the normal battery pack, and FIG. 5B is a view when using the large capacity battery pack. A state in which the strap 2 is mounted to the portable terminal 1 will be described with reference to FIGS. 3A to 5B.

The strap 2 includes a plate portion 21 made of leather or cloth, and is mounted to the back surface 13 of the main body 10 by attaching the strap 2 to the strap fixing portions 16a to 16d of the main body 10 by a metal fitting, a string or the like. Incidentally, a surface of the strap 2 shown in FIG. 3B is mounted so as to face the back surface 13 of the main body 10.

As can be seen in FIGS. 4A and 4B, support portions such as a string extending from the plate portion 21 are bound to the strap fixing portions 16a to 16d of the portable terminal 1. Incidentally, an attachment structure is not limited to the above binding.

As described above, while the plate portion 21 of the strap 2 is attached to the strap fixing portions 16a to 16d of the main body 10 in the first area S1 or the seventh area S7, the camera 14 is provided in the third area S3 from the second area S2, so that the string or the like does not block the camera 14.

The strap 2 includes a rotation mechanism portion 22 to be described later. The rotation mechanism portion is located at a substantially central portion of the plate portion 21. In addition, in a case where the strap 2 is mounted to the main body 10 of the portable terminal 1, a rotation axis C of the rotation mechanism portion 22 is located in the fourth area of the main body 10 (see FIG. 6A for the rotation axis C).

A grip portion 23 is provided on the rotation mechanism portion 22. In order to allow the strap 2 to be gripped, a space in which a finger can be inserted is provided in the grip portion 23 (see FIG. 7). A user of the portable terminal 1 grips the grip portion 23 to operate the portable terminal 1.

A folded portion 24 is provided in the plate portion 21 of the strap 2. In a case where the strap 2 is mounted to the main body 10 of the portable terminal 1, the folded portion 24 is substantially orthogonal to the longitudinal direction, and is provided at a position of the third area S3.

In a case where the strap 2 is mounted to the main body 10 of the portable terminal 1, the folded portion 24 is bent in a direction of the back surface 13 of the portable terminal 1. By providing the folded portion 24 as described above, the plate portion 21 of the strap 2 is not bent even when the large capacity battery pack is mounted to the portable terminal 1 (see FIG. 5B). That is, a flat state can be maintained on a portion of the plate portion 21 in the vicinity of the grip portion 23.

Figure 6A:
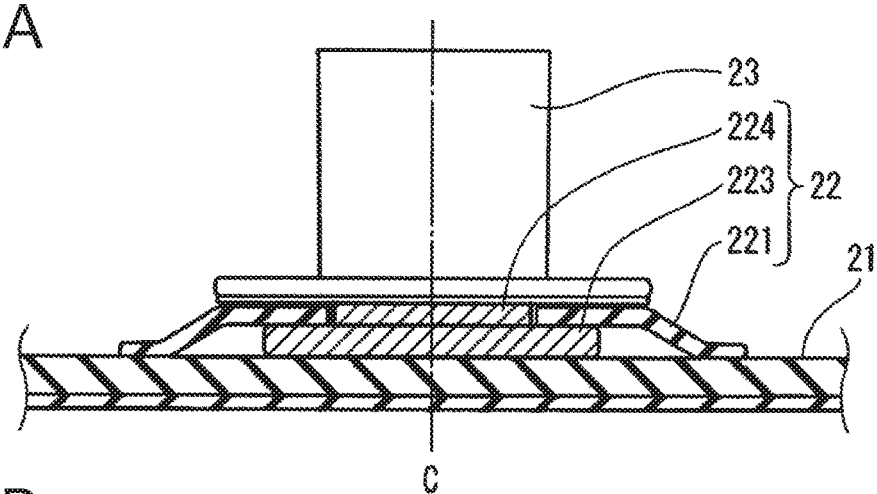
FIGS. 6A and 6B are explanatory views of a rotation mechanism portion included in the strap.
Figure 6B:
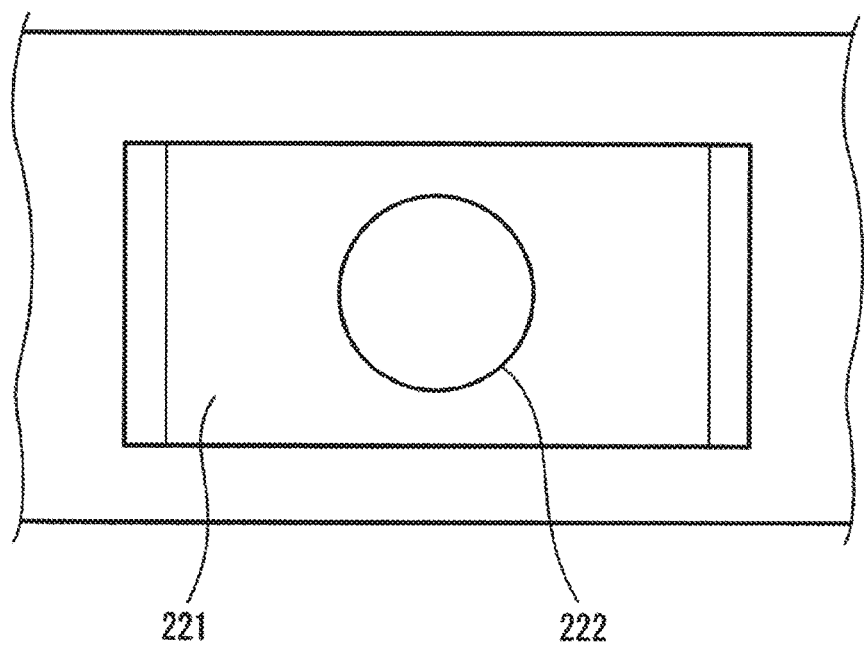
Figure 7:
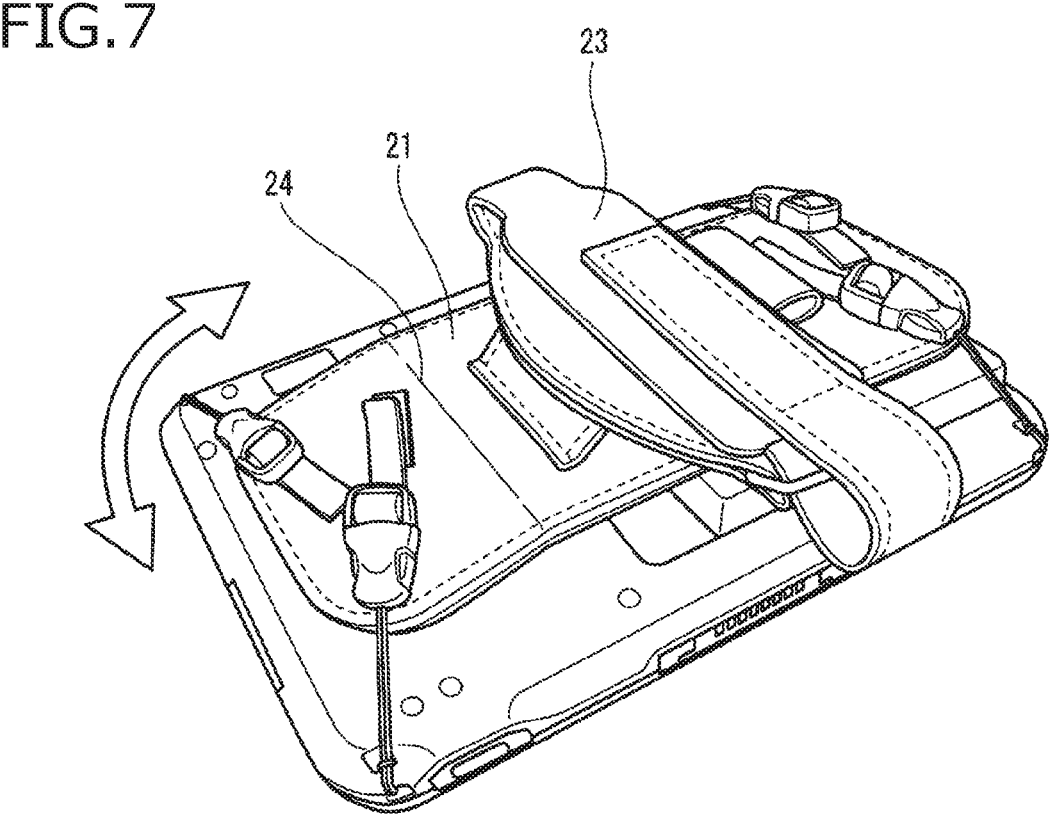
FIG. 7 is a view showing that a portable terminal 1 to which the strap 2 is mounted is rotatable.

FIGS. 6A and 6B are explanatory diagrams of the rotation mechanism portion 22 included in the strap 2 of FIGS. 5A and 5B. FIG. 7 is a view showing that the portable terminal 1 to which the strap 2 is mounted is rotatable. The rotation of the portable terminal 1 and the strap 2 will be described with reference to these drawings.

The rotation mechanism portion 22 in the present embodiment includes a trapezoidal member 221. Both end portions of the trapezoidal member 221 are sewn to the plate portion 21 of the strap 2. The trapezoidal member 221 has a hole 222 at a central portion thereof. The grip portion 23 is provided at an upper side of the hole 222. A rotation support plate 223 is provided at a lower side of the hole 222. The rotation support plate 223 and a lower surface of the grip portion 23 are sewn together via an intermediate member 224 passing through the hole 222.

In a case where the strap 2 includes the rotation mechanism portion 22 configured as described above, when the plate portion 21 is bent due to an influence of the large capacity battery pack being mounted, an upper surface of the plate portion 21 may press a lower surface of the rotation support plate 223, thereby inhibiting the rotation of the rotation mechanism portion 22.

In the present embodiment, as shown in FIG. 7, the strap 2 includes the folded portion 24 as described above. By bending the folded portion 24, bending of the plate portion 21 of the strap 2 can be avoided. Therefore, the rotation mechanism portion 22 can perform good rotation without being inhibited by the plate portion 21.

Figure 8A:
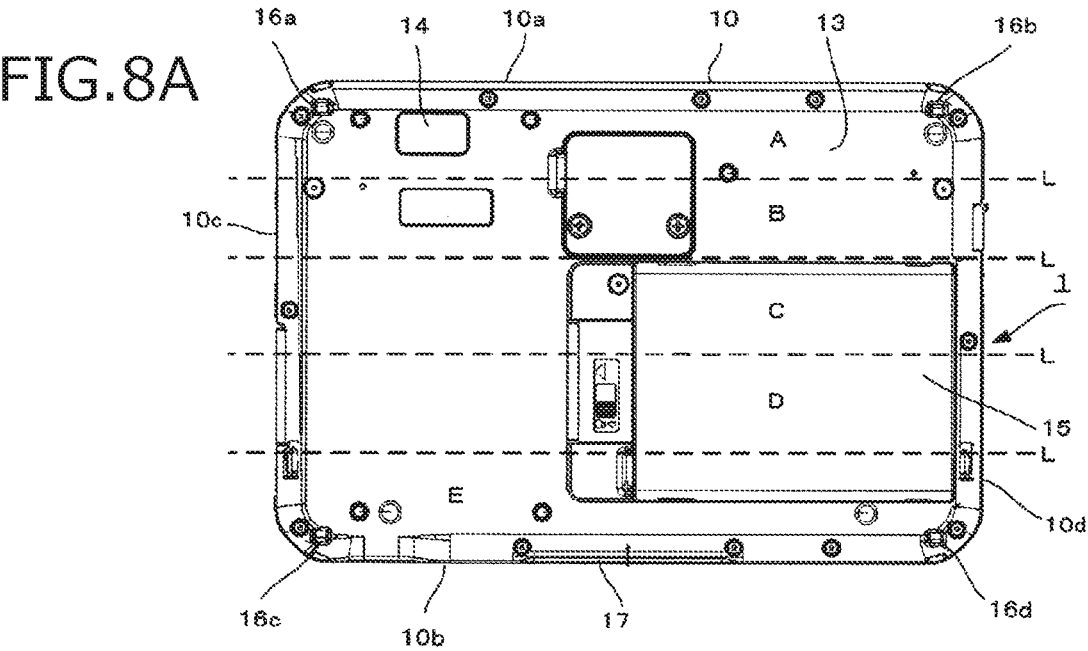
Figure 8B:
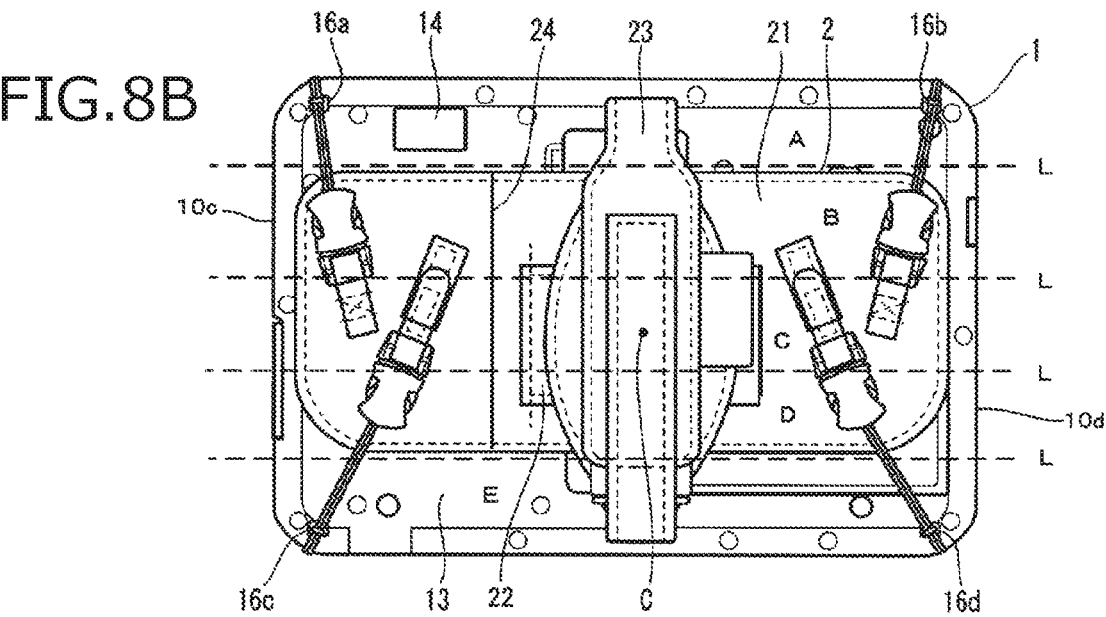

FIGS. 8A and 8B are views showing an area division in a short side direction of the portable terminal 1, in which FIG. 8A is a view showing a state in which the strap 2 is not mounted to the portable terminal 1, and FIG. 8B is a view showing a state in which the strap 2 is mounted to the portable terminal 1.

In the same way as FIGS. 2A and 2B as described above, an imaginary line L (see a broken line in FIGS. 8A and 8B) which divides each of two sides 10c, 10d in a shorter side direction of the main body 10 into five equal parts is virtually arranged, the imaginary line divides the main body 10 into five areas in a plan view from the back surface 13, and the five areas including a left side 10c are defined as an A area, a B area, a C area, a D area, and an E area in order from the top.

In this case, the battery pack storage area 15 storing the battery pack is provided in the E area from the C area including the C area, and the camera 14 is provided in the A area. With this arrangement, even when the portable terminal 1 is rotated either vertically or horizontally as shown in FIG. 7, the heavy battery pack is arranged on the lower side, so that a stability can be increased, and the camera 14 can be arranged on an upper side in which the photographing can be easily performed.

In an example of FIGS. 8A and 8B, the plate portion 21 of the strap 2 is provided in the D area from the B area. In this position, in either state in which the portable terminal 1 is oriented vertically or horizontally, or even in the case of using the large capacity battery pack, the rotation mechanism portion 22, and the grip portion 23 of the strap 2, and the gripping hand do not block a field of view of the camera 14.

Since the plate portion 21 of the strap 2 is provided at the above position, the strap 2 does not inhibit a connection between the connector 17 at the lower portion of the portable terminal 1 and the cradle for the portable terminal 1 (not shown). Further, since the rotation mechanism portion 22 of the strap 2 is arranged substantially at the center of the portable terminal 1 to which the strap 2 is mounted, the portable terminal 1 can be stably gripped even when the portable terminal 1 is oriented either vertically or horizontally.

As described above, the strap according to the present embodiment is used for a portable terminal, the portable terminal has a rectangular shape in a plan view, and includes the main body with a first surface having a display and a second surface facing the first surface, a camera capable of photographing an object in a state that the second surface facing the object, and a strap fixing portion, among four sides of the second surface of the main body, imaginary lines dividing two sides of the four sides of the second surface of the main body, which are extending in a longitudinal direction and are longer than the other two sides, into seven equal parts is virtually arranged, the imaginary lines divides the main body into seven areas in a plan view from the second surface, when the main body is arranged in which one of the two sides longer than the other two sides is arranged on an upper side, and the seven areas are defined as a first area to a seventh area in order from the left or from the right, a battery pack storage area of the main body storing a battery pack is provided in an area extending from the fourth area to the seventh area of the portable terminal, the camera is provided in an area extending from the second area to t the third area of the portable terminal, a strap fixing portion is provided in at least one of the first area and the seventh area of the portable terminal, and the strap includes a plate portion configured to be mounted on the second surface of the main body by attaching to the strap fixing portion, a rotation mechanism portion located at a substantially central portion of the plate portion and having a rotation axis located in the fourth area when the strap is mounted to the main body, a grip portion provided on the rotation mechanism portion and configured to be gripped by a user of the portable terminal, and a folded portion provided on the plate portion, and located at a position of the third area so as to be substantially orthogonal to the longitudinal direction, and to be bent in a direction toward the second surface of the portable terminal when the strap is mounted to the main body.

The strap fixing portion provided in the portable terminal is, for example, a strap hole, and a string-like support portion provided on the plate portion of the strap is bound to the strap hole.

According to the above embodiment of the present disclosure, even when the portable terminal is rotated either vertically or horizontally while gripping the portable terminal through the strap, since the battery pack storage area storing a heavy battery pack is always located at a lower side of the main body, a user can stably grip the main body of the portable terminal. In addition, the camera is always located at an upper portion of the back surface of the main body even in either a vertically oriented state or a horizontal oriented state of the main body, so that the camera can be avoided from being blocked by a hand or the like of the user even in either the vertically oriented state or the horizontal oriented state of the main body. Further, even when a large capacity battery pack protruding in a state of being raised from the back surface of the portable terminal is mounted, the strap further mounted to the main body does not inhibit the vertical and horizontal rotation of the portable terminal. Therefore, it is possible to provide the portable terminal which is not only capable of being operated both vertically and horizontally but also has a long drive time.

Although the embodiments of the portable terminal according to the present disclosure have been described above with reference to the drawings, the present disclosure is not limited to such examples, it will be apparent to those skilled in the art that various alterations, modifications, substitutions, additions, deletions, and equivalents can be conceived within the scope of the claims, and it should be understood that they also belong to the technical scope of the present disclosure.

This application is based on Japanese Patent Application (No. 2018-240945) filed on Dec. 25, 2018, the contents of which are incorporated herein by reference.

The portable terminal according to the present disclosure is useful in the field of a device that can be used both horizontally and vertically in a gripped state and be stably operated.

What is claimed is:

1. A strap used in a portable terminal, the portable terminal having a rectangular shape in a plan view and including a main body with a first surface having a display and a second surface facing the first surface, a camera capable of photographing an object in a state that the second surface facing the object, and a strap fixing portion, among four sides of the second surface of the main body, imaginary lines dividing two sides of the four sides of the second surface, which are extending in a longitudinal direction and are longer than the other two sides, into seven equal parts being virtually arranged, and the imaginary lines dividing the main body into seven areas in a plan view from the second surface, when the main body is arranged in which one of the two sides longer than the other two sides is arranged on an upper side, and the seven areas are defined as a first area to a seventh area in order from the left or from the right, a battery pack storage area of the main body storing a battery pack being provided in an area extending from the fourth area to the seventh area of the portable terminal, and the camera being provided in an area extending from the second area to the third area of the portable terminal, and the strap fixing portion being provided in at least one of the first area and the seventh area of the portable terminal, the strap comprising:

a plate portion configured to be mounted on the second surface of the main body by attaching to the strap fixing portion;

a rotation mechanism portion located at a substantially central portion of the plate portion and having a rotation axis located in the fourth area when the strap is mounted to the main body;

a grip portion provided on the rotation mechanism portion and configured to be gripped by a user of the portable terminal; and a folded portion provided on the plate portion, and located at a position of the third area so as to be substantially orthogonal to the longitudinal direction, and to be bent in a direction toward the second surface of the portable terminal when the strap is mounted to the main body.

2. The strap according to claim 1, wherein the strap fixing portion is a strap hole;

wherein a string-like support portion is provided on the plate portion; and wherein the string-like support portion is bound to the strap hole.

3. The strap according to claim 2, wherein the plate portion is made of leather.

* * * * *